(12) United States Patent
Brillant et al.

(10) Patent No.: US 8,660,208 B2
(45) Date of Patent: Feb. 25, 2014

(54) APPARATUS AND METHODS FOR QAM MODULATION USING DUAL POLAR MODULATION

(75) Inventors: Avigdor Brillant, Haifa (IL); David Pezo, Haifa (IL); Haim M. Weissman, Haifa (IL); Jeremy M. Stein, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 12/907,830

(22) Filed: Oct. 19, 2010

(65) Prior Publication Data

US 2011/0090988 A1 Apr. 21, 2011

Related U.S. Application Data

(60) Provisional application No. 61/253,421, filed on Oct. 20, 2009.

(51) Int. Cl.
*H04L 27/36* (2006.01)

(52) U.S. Cl.
USPC ........... 375/298; 375/261; 375/285; 375/295; 375/296; 375/297; 455/63.1; 455/67.13; 455/69; 455/91; 455/114.3; 455/127.1; 330/149; 329/304

(58) Field of Classification Search
USPC .................. 375/298, 261, 285, 295, 296, 297; 455/63.1, 67.13, 69, 91, 114.3, 127.1; 330/149; 329/304
See application file for complete search history.

(56) References Cited

U.S. PATENT DOCUMENTS

| | | | |
|---|---|---|---|
| 5,584,057 A * | 12/1996 | Dent | 455/101 |
| 5,990,738 A * | 11/1999 | Wright et al. | 330/149 |
| 6,889,034 B1 * | 5/2005 | Dent | 455/102 |
| 7,260,157 B2 * | 8/2007 | Hagh et al. | 375/297 |
| 7,570,711 B1 * | 8/2009 | Chavez et al. | 375/298 |
| 7,839,231 B1 * | 11/2010 | Groe et al. | 332/103 |
| 2004/0101065 A1 | 5/2004 | Hagh et al. | |
| 2005/0101267 A1 * | 5/2005 | Smithson | 455/108 |
| 2007/0286308 A1 * | 12/2007 | Williams | 375/302 |
| 2009/0033416 A1 | 2/2009 | Rofougaran | |

OTHER PUBLICATIONS

Zhihua Zheng et al, "Next Generation Passive Optical Network Based on OFDM Transmission", 2009 WASE International conference on Information Engineering, DOI 10.1109/ICIE.2009.239, IEEE Computer Society, pp. 329-332.*
International Search Report and Written Opinion—PCT/US2010/053333, International Search Authority—European Patent Office—Mar. 22, 2011.

* cited by examiner

*Primary Examiner* — Leon Flores
(74) *Attorney, Agent, or Firm* — Stanton Braden

(57) ABSTRACT

Apparatus and methods for QAM modulation are disclosed using dual polar modulation. QAM modulation of a signal is accomplished by translating a QAM signal into two phasors having the same or constant amplitude and then phase shifting one of the phasor by 180 degrees for a differential load. The phasors are then polar modulated such that, when differentially combined in the load through summation or superposition, a QAM modulated symbol results. The use of constant amplitude phasors when power amplified for transmission of QAM modulated signals allows amplifiers to be operated in a saturation mode with greater efficiency than conventional amplifiers used in QAM modulation, which operate in a less efficient linear mode to effect amplitude modulation. Additionally, differential combining of the phasors affords relaxation of the turns of a transformer used in amplifying the phasors.

42 Claims, 10 Drawing Sheets

APPARATUS AND METHODS FOR QAM MODULATION USING DUAL POLAR MODULATION

CLAIM OF PRIORITY UNDER 35 U.S.C. §119

The present Application for Patent claims priority to Provisional Application No. 61/253,421 entitled "QAM MODULATION USING DUAL POLAR MODULATION" filed Oct. 20, 2009, and assigned to the assignee hereof and hereby expressly incorporated by reference herein.

BACKGROUND

1. Field

The present disclosure relates generally to methods and apparatus for QAM modulation, and more specifically to QAM modulation of signals using a pair of constant envelope polar modulated phasors that afford more efficient power amplification of the signals.

2. Background

In communication systems, whether in wired or wireless communication systems, data symbols are conveyed on carrier signals by modulating the signals using various modulation schemes. One such known scheme is Quadrature Amplitude Modulation (QAM). In QAM, a mapped symbol is defined by two orthogonal voltages defined as the in phase (I) and quadrature (Q) voltages. The number of bits representing each symbol at I and Q for a square constellation of defined I, Q points is given by:

$$N = \log_2 \sqrt{QAM\_Size} \quad (1)$$

where QAM_Size is the constellation size such as 4, 16, 64, 256 QAM etc., and N is the number of bits for I and for Q. For example, a QAM_Size=64 would yield $N=3=\log_2\sqrt{64}$ thus overall 6 bits 3 for I and 3 for Q.

Consequently, each point in an I/Q plane can be described by two sets of orthogonal voltages. In other words, the equivalent vector is the sum of two orthogonal vectors that are varying in time. The equivalent vector R(t) is given by:

$$R(t) = \sqrt{I(t)^2 + Q(t)^2} \quad (2)$$

where the phase φ(t) is given by $$\phi(t) = \tan^{-1}\left(\frac{Q(t)}{I(t)}\right). \quad (3)$$

Accordingly, representing the vector in complex domain I and Q projections is given by:

$$\begin{cases} I(t) = \text{Re}\{R(t)\exp(j\phi(t))\} \\ Q(t) = \text{Im}\{R(t)\exp(j\phi(t))\} \end{cases} \quad (4)$$

Consequently, the equivalent vector varies in both amplitude and phase. In this manner it describes various symbols of a constellation of symbols at various times based on the I and Q values. When amplifying a non-constant envelope signal (i.e., a signal having varied amplitudes) by a power amplifier (PA), the amplification is associated with amplitude changes. A QAM signal, however, is associated not just with amplitude changes, but with phase changes as well, which may result in distortion when amplified by the PA. The amplitude change in a PA is associated with AM modulation. Hence, in transmitters, a PA has to be designed with high linearity and back-off in order to prevent distortions and spectral regrowth. Consequently, such amplifiers generally operate in a highly linear mode, such as a Class A amplifier for example, which results in low efficiency operation of the amplifier. Accordingly, there exists a need for developing a scheme for QAM modulation affording increased efficiency operation for a PA in a transceiver.

SUMMARY

According to an aspect, a method of quadrature amplitude modulation (QAM) of data in a communication system is disclosed. The method includes translating an input signal into two phasors having a same amplitude or constant envelope and phase shifting one of the phasors by 180 degrees for differential operation. After translation, the method further includes polar modulating each of the two phasors, and then differentially combining the two polar modulated phasors in a load to achieve a QAM modulated symbol. In this manner, QAM modulation may be accomplished by using two amplifiers operating in a more power efficient saturation region, with a relaxed transformer turns ratio of the amplifiers amplifying the phasors due to differential combining.

According to another aspect, an apparatus for QAM modulation of data in a communication system is disclosed. The apparatus includes means for translating an input signal into two phasors having a same amplitude and phase shifting one of the phasors by 180 degrees. The apparatus also includes means for polar modulating each of the two phasors, and means for differentially combining the two polar modulated phasors in a load to achieve a QAM modulated symbol.

In yet another aspect, an apparatus for QAM modulation of data in a communication system is disclosed. The apparatus includes a translator configured to translate an input signal into two phasors having a same amplitude or constant envelope and a phase shifter to shift one of the phasors by 180 degrees. The apparatus also includes first and second polar modulators configured to respectively receive and polar modulate a respective phasor of the two phasors. Additionally, the apparatus includes a combiner configured to differentially combine the two polar modulated phasors in a load to achieve a QAM modulated symbol.

In still one more aspect, a computer program product, comprising a computer-readable medium is disclosed. The medium includes code for causing a computer to translate an input signal into two phasors having a same amplitude for QAM modulation of data in a communication system and phase shift one of the phasors by 180 degrees. The medium also includes code for causing a computer to polar modulate each of the two phasors, and code for causing a computer to control differential combining of the two polar modulated phasors in load to achieve a QAM modulated symbol.

DETAILED DESCRIPTION

Figure 1:
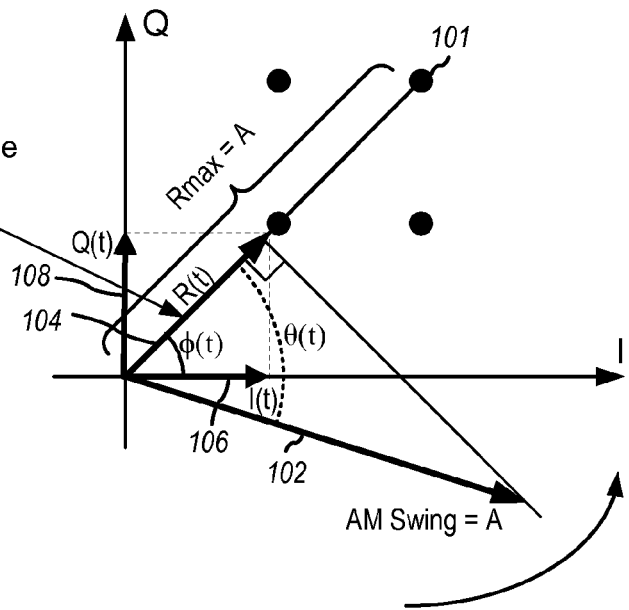
FIG. 1 is a plot of a phasor projection onto a QAM amplitude modulation.

The presently disclosed methods and apparatus provide a QAM modulation scheme allowing amplifiers in a transceiver to be operated in a saturation mode, thus allowing high efficiency operation. In particular, the present disclosure relies upon a realization that each vector of a QAM signal can be described as a sum of two phase vectors or "phasors". The two phasors, in turn, can be configured to exhibit a constant envelope (i.e., a constant amplitude) which only varies in phase over time. This realized characteristic is then inventively leveraged as a foundation for a smart linear power amplifier that utilizes two power amplifiers operating in saturation mode and, thus, high efficiency since the constant envelope (i.e., constant amplitude) allows such power amplifier operation without the need for operation in a linear mode with varying amplitudes. A vector summation of the two phasors allows the creation of a desired symbol in a QAM constellation, since it is known from linear algebra theory that in each space, a vector can be described by a linear combination of the spreading base.

It is first noted that the techniques described herein may be used for modulation and transmission in various wired, fiber, and wireless communication networks. Examples of wireless networks include CDMA networks, TDMA networks, FDMA networks, OFDMA networks, SC-FDMA networks, wireless local area networks (WLANs), and other networks. The terms "network" and "system" are often used interchangeably. A CDMA network may implement a radio access technology (RAT) such as Universal Terrestrial Radio Access (UTRA), cdma2000, etc. UTRA includes Wideband CDMA (WCDMA) and other variants of CDMA. cdma2000 covers CDMA 1X and High Rate Packet Data (HRPD). A TDMA network may implement a RAT such as Global System for Mobile Communications (GSM). An OFDMA network may implement a RAT such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a RAT such as IEEE 802.11, Hiperlan, etc. The techniques described herein may be used for the wireless networks and RATs mentioned above as well as other wireless networks and RATs. For clarity, certain aspects of the techniques are described below for 1xEV-DO (Evolution-Data Optimized) or High Rate Packet Data (HRPD), and HRPD terminology is used in much of the description below.

For purposes of the following discussion, it is first noted that a constant envelope phasor can be characterized by the following parameters: A, which represents a constant amplitude voltage; and $\phi(t)1$ and $\phi(t)2$, which are the phases of the two phasors, respectively. On the other hand a desired QAM symbol is characterized at a given instant with a given phase $\theta(t)$ and amplitude of $R(t)$, or by a given value of $I(t)$ and $Q(t)$.

As an example, FIG. 1 illustrates a phasor diagram wherein an amplitude modulated (AM) signal is superimposed on a polar modulation (PM). To simplify the discussion, a certain phase state in the constellation (e.g., of which point 101 is called out as merely one point in the QAM constellation of points or values) is illustrated and analyzed as an AM modulation superimposed on PM modulation. FIG. 1 shows a rotating phasor 102, wherein phase angle $\theta(t)$ is the phase between the rotating phasor 102 and its orthogonal projection 104 onto $R(t)$, which has a phase of $\phi(t)$ with respect to the real axis I.

From equations (4) presented previously, the value of $I(t)$ (106 in FIG. 1) of orthogonal projection 104 can be represented by the following equation:

$$I(t) = Re\{R(t)\exp(j\phi(t))\} = R(t)\cos(\phi(t)) \quad (5).$$

Observing FIG. 1 and recognizing the trigonometric cofunction $\sin(90°-\theta)=\cos\theta$, it is evident that equation (5) can be expressed in terms of the amplitude A of phasor 102 as:

$$I(t) = R(t)\cos(\phi(t)) = A\cos(\theta(t))\cos(\phi(t)) \quad (6).$$

Using known trigonometric identities of converting product-to-sum, equation (6) can be broken into a sum as indicated the following representation of $I(t)$ in terms of the amplitude A of phasor 102:

$$\begin{aligned}I(t) &= A\cos(\theta(t))\cos(\phi(t)) \\ &= \frac{A}{2}\cos(\theta(t) + \phi(t)) + \frac{A}{2}\cos(\theta(t) - \phi(t)).\end{aligned} \quad (7)$$

In the same manner the value for vector $Q(t)$ (108 in FIG. 1) is given by the following equation expressed as:

$$Q(t) = Im\{R(t)\exp(j\phi(t))\} = R(t)\sin(\phi(t)) \quad (8).$$

Accordingly, breaking equation (8) into a sum yields the following representation for $Q(t)$ in terms of the amplitude A of phasor 102:

$$\begin{aligned}Q(t) &= A\cos(\theta(t))\sin(\phi(t)) \\ &= \frac{A}{2}\sin(\theta(t) + \phi(t)) - \frac{A}{2}\sin(\theta(t) - \phi(t)).\end{aligned} \quad (9)$$

The present application recognizes that equations (7) and (9) provide a pair of two constant envelope phasor projections. Accordingly, by using two constant envelope phasors, it is recognized that a desired QAM signal can be generated therefrom. In particular, equations (7) and (9) define the mapping from I/Q to the two constant envelope phasors. Accordingly, each term in these equations describes an instantaneous value of I1 and Q1 and I2 and Q2 of the two phasors. Hence, the following relations can be defined using respective terms from each of equations (7) and (9).

$$\begin{cases} I_1(t) = \frac{A}{2}\cos(\theta(t) + \phi(t)) \\ Q_1(t) = \frac{A}{2}\sin(\theta(t) + \phi(t)) \end{cases} \quad (10)$$

$$\begin{cases} I_2(t) = \frac{A}{2}\cos(\theta(t) - \phi(t)) \\ Q_2(t) = -\frac{A}{2}\sin(\theta(t) - \phi(t)). \end{cases} \quad (11)$$

Figure 2:
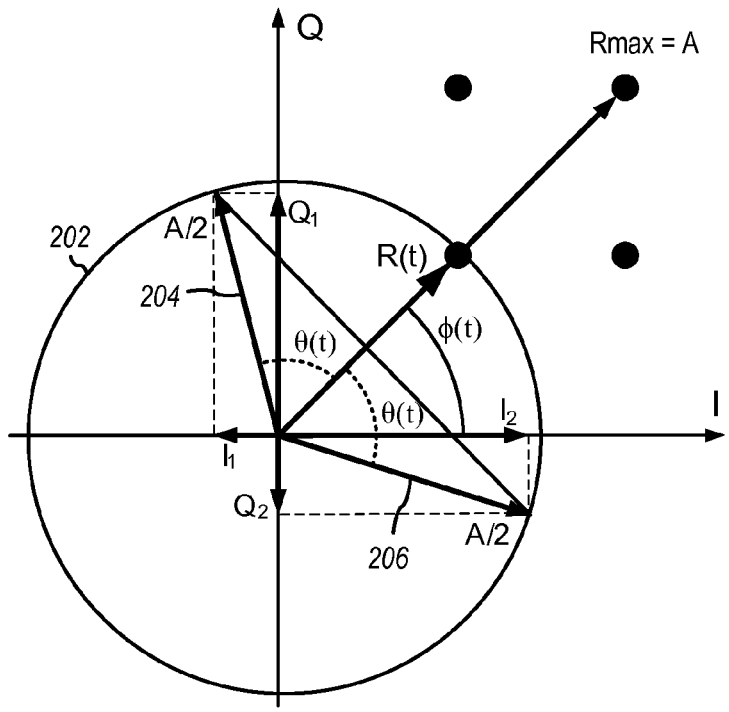
FIG. 2 is a plot of two constant envelope phasors, which combine to equal an amplitude modulated QAM symbol.

Equations (10) and (11) describe the phases $\phi(t)1$, $\phi(t)2$ of the constant envelope phasors discussed previously. It is clear from equation (10) that $\phi(t)1=\theta(t)+\phi(t)$ and from equation (11) that $\phi(t)2=\theta(t)-\phi(t)$. Based on equations (10) and (11), FIG. 2 illustrates a derivation of a mapping formulation from QAM to constant envelope values of I1 and Q1 and I2 and Q2. The constant envelope is represented by line 202. From the AM superimposing process presented in FIG. 1, $\theta(t)$ can be derived as function of A and R(t). Hence, as may be seen from equation (6), R(t) can be expressed as $$R(t) = A\cos(\theta(t)) \quad (12).$$

However, as may be seen in equation (2), R(t) may also be expressed as:

$$R(t) = \sqrt{I(t)^2 + Q(t)^2} \quad (13).$$

Thus, if equations (12) and (13) as set equal to each other, the following relationships may be derived:

$$\begin{cases} \cos\theta(t) = \frac{\sqrt{I(t)^2 + Q(t)^2}}{A} \\ \theta(t) = \arccos\left(\frac{\sqrt{I(t)^2 + Q(t)^2}}{A}\right). \end{cases} \quad (14)$$

It is also clear from equations (6) and (13) that the polar modulation angle $\phi(t)$ may be given by:

$$\begin{cases} \cos\phi(t) = \frac{I(t)}{\sqrt{I(t)^2 + Q(t)^2}} \\ \sin\phi(t) = \frac{Q(t)}{\sqrt{I(t)^2 + Q(t)^2}}. \end{cases} \quad (15)$$

Accordingly, using expressions (10)-(15) provides a translation formulation for the I(t) value of an exemplary constant envelope phasor (i.e., 204 in FIG. 2) given as:

$$I_1(t) = \frac{A}{2}\frac{\sqrt{I(t)^2 + Q(t)^2}}{A}\frac{I(t)}{\sqrt{I(t)^2 + Q(t)^2}} - \quad (16)$$

-continued $$\frac{A}{2}\left(\sqrt{1 - \frac{I(t)^2 + Q(t)^2}{A^2}}\right)\frac{Q(t)}{\sqrt{I(t)^2 + Q(t)^2}}.$$

If A=1 (i.e., normalizing all to the peak energy), then $I_1(t)$ can be expressed as the following normalized expression:

$$\hat{I}_1(t) = \frac{\hat{I}(t)}{2} - \frac{\hat{Q}(t)}{2}\left(\sqrt{\frac{1}{\hat{I}(t)^2 + \hat{Q}(t)^2} - 1}\right). \quad (17)$$

Correlatively, the value of $Q_1(t)$ can be expressed with the following equation:

$$Q_1(t) = \frac{A}{2}\left(\sqrt{1 - \frac{I(t)^2 + Q(t)^2}{A^2}}\right)\frac{I(t)}{\sqrt{I(t)^2 + Q(t)^2}} + \quad (18)$$

$$\frac{A}{2}\frac{\sqrt{I(t)^2 + Q(t)^2}}{A}\frac{Q(t)}{\sqrt{I(t)^2 + Q(t)^2}}$$

Again, if A is set to a value of 1, the normalized expression for $Q_1(t)$ becomes:

$$\hat{Q}_1(t) = \frac{\hat{Q}(t)}{2} + \frac{\hat{I}(t)}{2}\left(\sqrt{\frac{1}{\hat{I}(t)^2 + \hat{Q}(t)^2} - 1}\right). \quad (19)$$

As will be clear to those skilled in the art, the derivation for $I_2(t)$ and $Q_2(t)$ follows the same logic as the derivation of $I_1(t)$ and $Q_1(t)$. Accordingly, $I_2(t)$ may be expressed as follows:

$$I_2(t) = \frac{A}{2}\frac{\sqrt{I(t)^2 + Q(t)^2}}{A}\frac{I(t)}{\sqrt{I(t)^2 + Q(t)^2}} + \quad (20)$$

$$\frac{A}{2}\left(\sqrt{1 - \frac{I(t)^2 + Q(t)^2}{A^2}}\right)\frac{Q(t)}{\sqrt{I(t)^2 + Q(t)^2}}$$

If A is set equal to one (1), a normalized equation is expressed as:

$$\hat{I}_2(t) = \hat{I}(t) + \hat{Q}(t)\left(\sqrt{\frac{1}{\hat{I}(t)^2 + \hat{Q}(t)^2} - 1}\right). \quad (21)$$

Correlatively, the value of $Q_2(t)$ can be expressed with the following equation:

$$Q_2(t) = -\frac{A}{2}\left(\sqrt{1 - \frac{I(t)^2 + Q(t)^2}{A^2}}\right)\frac{I(t)}{\sqrt{I(t)^2 + Q(t)^2}} + \quad (22)$$

$$\frac{A}{2}\frac{\sqrt{I(t)^2+Q(t)^2}}{A}\frac{Q(t)}{\sqrt{I(t)^2+Q(t)^2}}$$

Setting A=1, a normalized equation may be expressed as:

$$\hat{Q}_2(t) = \frac{\hat{Q}(t)}{2} - \frac{\hat{I}(t)}{2}\left(\sqrt{\frac{1}{\hat{I}(t)^2+\hat{Q}(t)^2}}-1\right) \quad (23)$$

Equations 17, 19, 21, and 23 above provide the translation formulation from I and Q values into two constant envelope polar modulated (PM) phasors with $I_1$ and $Q_1$ and $I_2$ and $Q_2$, respectively. If the equations are all multiplied by 2, the translation can be further simplified. Hence, mapping formulas may be expressed as follows:

$$\hat{I}_1(t)' = 2\hat{I}_1(t) = \hat{I}(t) - \hat{Q}(t)\left(\sqrt{\frac{1}{\hat{I}(t)^2+\hat{Q}(t)^2}}-1\right) \quad (24)$$

$$\hat{Q}_1(t)' = 2\hat{Q}_1(t) = \hat{Q}(t) + \hat{I}(t)\left(\sqrt{\frac{1}{\hat{I}(t)^2+\hat{Q}(t)^2}}-1\right) \quad (25)$$

$$\hat{I}_2(t)' = 2\hat{I}_2(t) = \hat{I}(t) + \hat{Q}(t)\left(\sqrt{\frac{1}{\hat{I}(t)^2+\hat{Q}(t)^2}}-1\right) \quad (26)$$

$$\hat{Q}_2(t)' = 2\hat{Q}_2(t) = \hat{Q}(t) - \hat{I}(t)\left(\sqrt{\frac{1}{\hat{I}(t)^2+\hat{Q}(t)^2}}-1\right). \quad (27)$$

This means that there is a normalized constellation with a peak voltage of 1 and created by two constant envelopes each with value of ½ or, a constellation with a peak voltage of 2 and created by two constant envelopes each with value of 1.

The constellation normalization to unity is given by the following equations (28)-(31), which describe the peak energy.

$$I_{max} = Q_{max} = \max(I_{QAM}) = \max(Q_{QAM}) \quad (28)$$

$$R_{max} = \sqrt{I_{max}^2 + Q_{max}^2} \quad (29)$$

$$\hat{I}(t) = \frac{I(t)}{\sqrt{2}\,R_{max}} = \frac{I(t)}{\sqrt{2(I_{max}^2+Q_{max}^2)}} \quad (30)$$

Thus, the maximal normalized values satisfy the following:

$$\hat{I}_{max} = \hat{Q}_{max} = \frac{\sqrt{2}}{2} \text{ and } \hat{R}_{max} = A = 1. \quad (31)$$

In light of the above equations, a methodology for providing a QAM modulation using two constant envelope phasors is realized.

Figure 3:
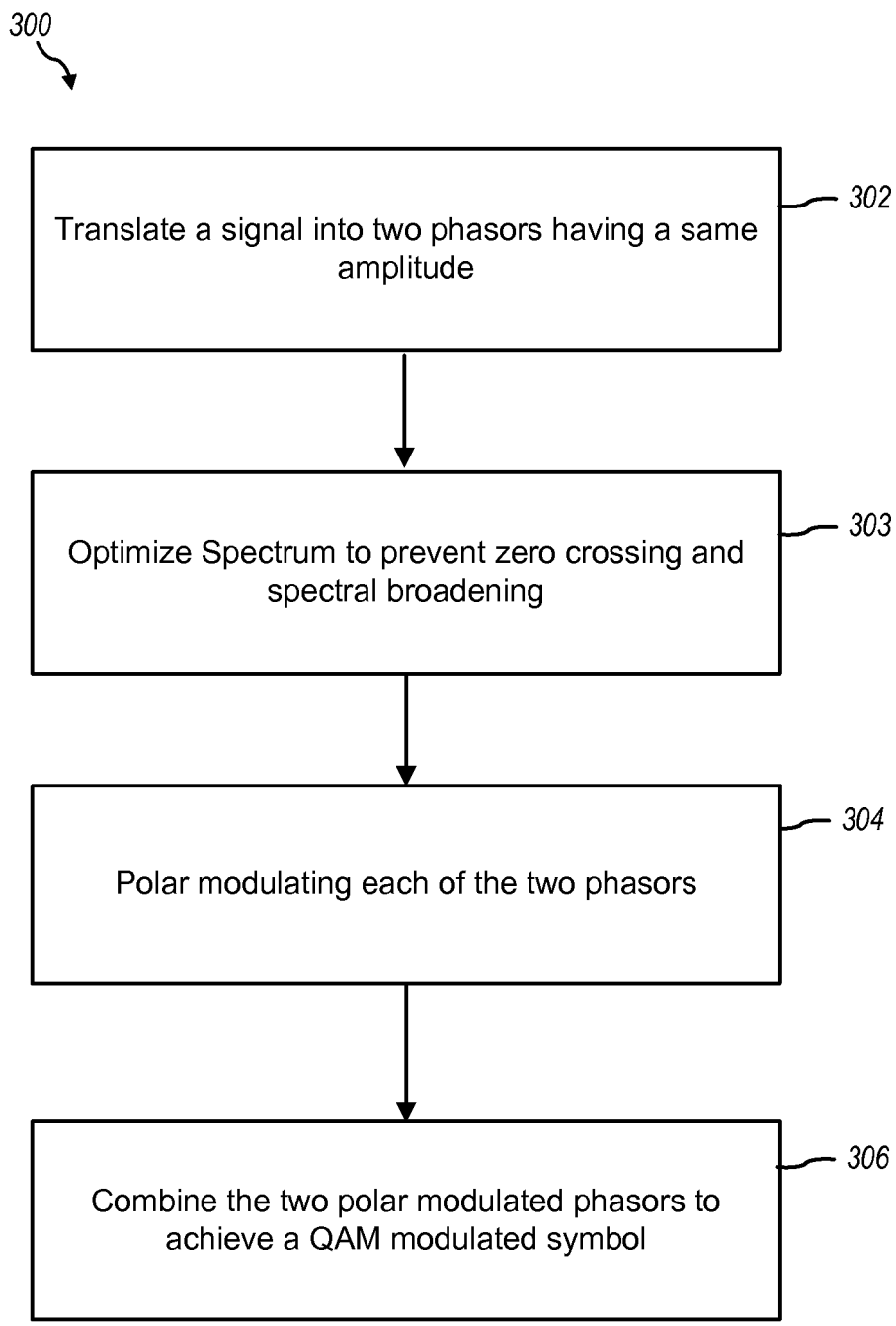
FIG. 3 illustrates a flow diagram of an exemplary method for achieving QAM modulation using polar modulation with constant envelope phasors.

According to an aspect, a method for QAM modulation of data in a communication system can be realized based on the above discussed concepts and equation. FIG. 3 illustrates an exemplary method 300 that may be used for achieving QAM modulation using polar modulation with constant envelope phasors. As illustrated method 300 includes translating a signal into two phasors having a same amplitude as illustrated by the process of block 302. In particular, the translation in block 302 may be implemented by performing the transformation quantified in equations 17, 19, 21, and 23 above. More specifically, these equations provide the translation formulation from I and Q values into two constant envelope phase modulated (PM) phasors having components $I_1$ and $Q_1$ and $I_2$ and $Q_2$, respectively. Additionally in an aspect, the process 302 includes phase shifting one of the phasors by 180 degrees in preparation for differently combining the two phasors in a load.

It is noted that when a complex modulation signal is represented by translation into two other constant envelope components as discussed above and performed in block 302, the spectrum may become wider and with higher energy with zero crossings. Accordingly, in an example the process of block 302 may also include a process of optimizing the spectrum to prevent zero crossings and spectral broadening.

After translation of the I and Q values in block 302, the spectrum of the translated signals is optimized to prevent zero crossings and spectral broadenings as illustrated in block 303. The phasors are then polar modulated based on a particular QAM modulation scheme desired as illustrated by the process of block 304. For example, the phases of the constant envelope phasors are adjusted or set such that when the two phasors are combined, the desired resultant QAM symbol in a QAM constellation will result from the combination. Finally, method 300 includes differentially combining the two polar modulated phasors to achieve a desired QAM modulated symbol or vector (e.g., R(t)) as illustrated by block 306.

Method 300, as will be explained below, may be implemented through a number of various apparatus. Furthermore, method 300 may also include translation using mapping equations (24) through (27) to simplify computations required.

Figure 4:
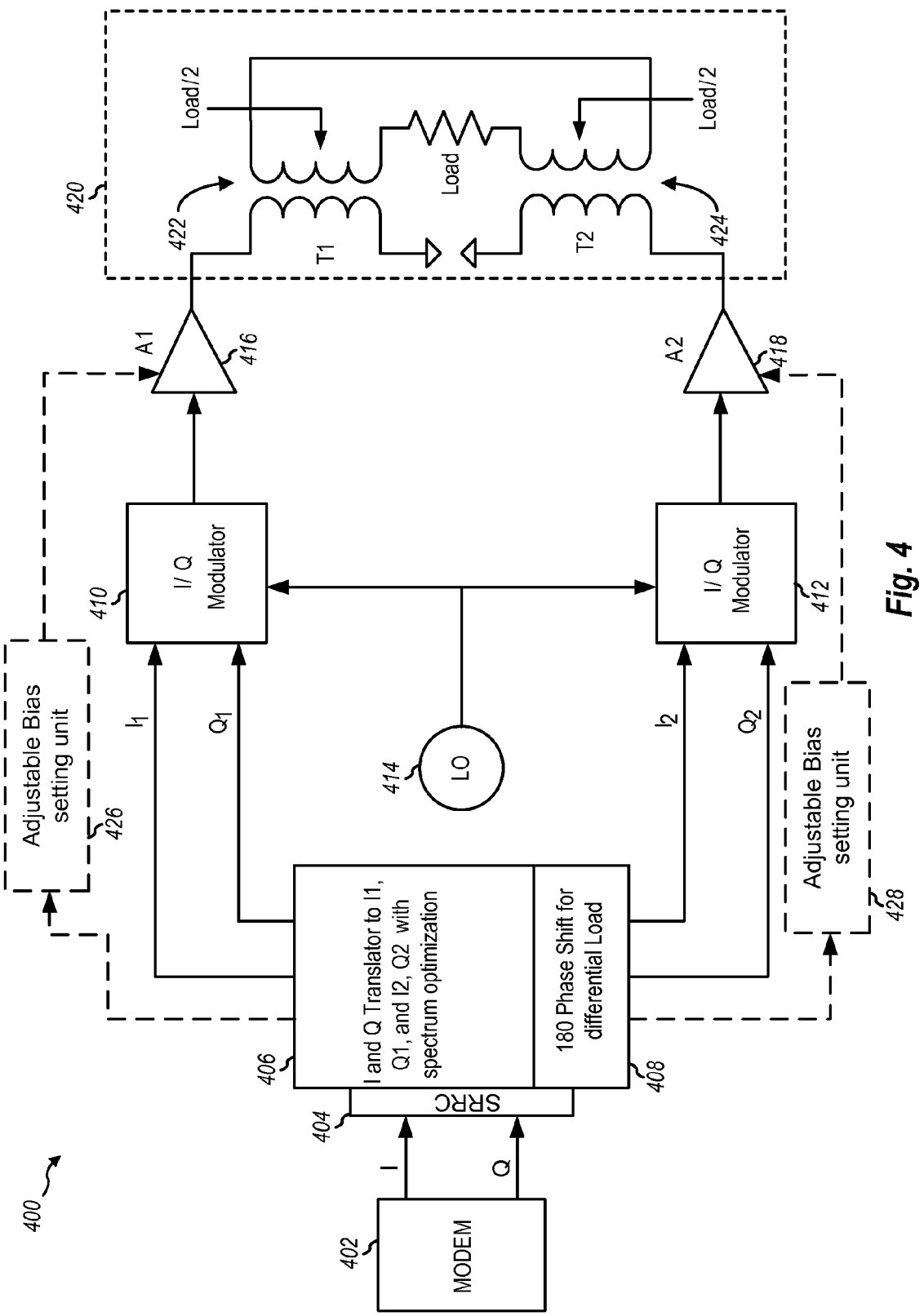
FIG. 4 is a circuit diagram of an exemplary transmitter achieving QAM modulation with constant envelope phasors.

Equations 17, 19, 21, and 23 presented above provide a straightforward realization for QAM modulation as depicted by the circuit diagram in FIG. 4 for a transmitter 400 for QAM signals. As illustrated, a modem 402 generates I and Q data streams. A Square Root Raised Cosine (SRRC) filter 404 is applied for each I and Q path and is part of IQ translation to polar modulation. A translator 406 is configured to translate the filtered I and Q data to two polar constant envelope phasor in accordance with the discussion above.

Additionally, it is noted that the translation equations as given previously are for in phase summation and not for a differential approach. Hence, in an aspect where a differential approach is taken, at least one pair of the equations needs to be phase shifted by 180 degrees (e.g., multiplied by −1) for differential combining. For example, the equations pair 21, 23 can be multiplied by −1 in a phase shift unit 408 (or phase shifter). An advantage of using a differential approach is the relaxing of transformer turns ratio, but this is not intended to be construed as a preferred aspect.

The respective phasor components I1 and Q1 or I2 and Q2, are fed to I/Q modulators 410 and 412, respectively. The modulators 410, 412 convert the received I and Q values to a constant envelope phasor with polar coordinates. Modulators 410, 412 may also be synchronized with a local oscillator (LO) 414 ensuring that the constant envelope phasors are correctly modulated at the same time. The phasors are then amplified by amplifiers 416 and 418. As the phasors are constant envelope phasors having a constant amplitude, the amplifiers 416, 418 may be configured to operate in a power efficient saturation mode, rather than in a less efficient linear mode as known in conventional transmitters.

The amplified phasors are then sent to a transmission portion that includes a transformer 420 that serves, among other functions, to combine the phasors into a QAM modulated signal for transmission. As odd mode excitation is occurring in a differential approach (i.e., 180 degrees out of phase), each branch has only half load. Thus, the turns ratio of each transformer coil 422, 424 is reduced and combining may be more efficient, especially when implemented in an integrated circuit or chip.

It is noted that in an example, using a stacked structure for transformer 420 may reduce transformation or turns ratio even further. When the spectrum of a complex modulation signal is represented by translation into two other constant envelope components as discussed above, the spectrum becomes wider and with higher energy with zero crossings. Hence, in an aspect, the modem translator (e.g., 406) includes a spectrum optimization algorithm to prevent extra spectral broadening and excessive energy, and zero crossings.

In an aspect, it noted that in general power amplifier bias voltage may be held at a constant level. This level is driven from power requirements based upon the signal level. Accordingly, there may be instances in time where the bias voltage is high but the signal level is low. This arises due to the signal peak-to-average ratio denoted as PAR. Sometimes the signal level at a given instance is below the average level, hence signal level to average has to be measured, denoted as SAR. Since there exists this advanced information about the signal level that is about to be transmitted prior to transmission, the setting bias voltage of the power amplifiers may take utilize this measurement to be optimized based on the expected SAR according to an alternative. As an example, FIG. 4 illustrates an alternative aspect including adjustable bias setting blocks 426 and 428, which adjust the bias voltage for amplifiers 416, 418, respectively. Blocks 426 and 428 utilize the advanced information concerning one or both of the PAR and SAR information derived in translator 406 to adjust the bias voltage for amplifiers 416, 418. Adding this alternative together with the translation algorithm effected by translator 406 improves the efficiency of the power amplification even further.

A challenge when in the power amplification of circuit 400 is to ensure a matching to the load with a low transformation ratio. The transformation ratio defines the transformer losses as well as its bandwidth due to parasitic effects. Hence, in one example the power amplifiers (416, 418) and transformer 420 of circuit 400 may be implemented by parallel current sources connected to a common transformer secondary. An example of such an amplifier is illustrated in FIG. 5.

Figure 5:
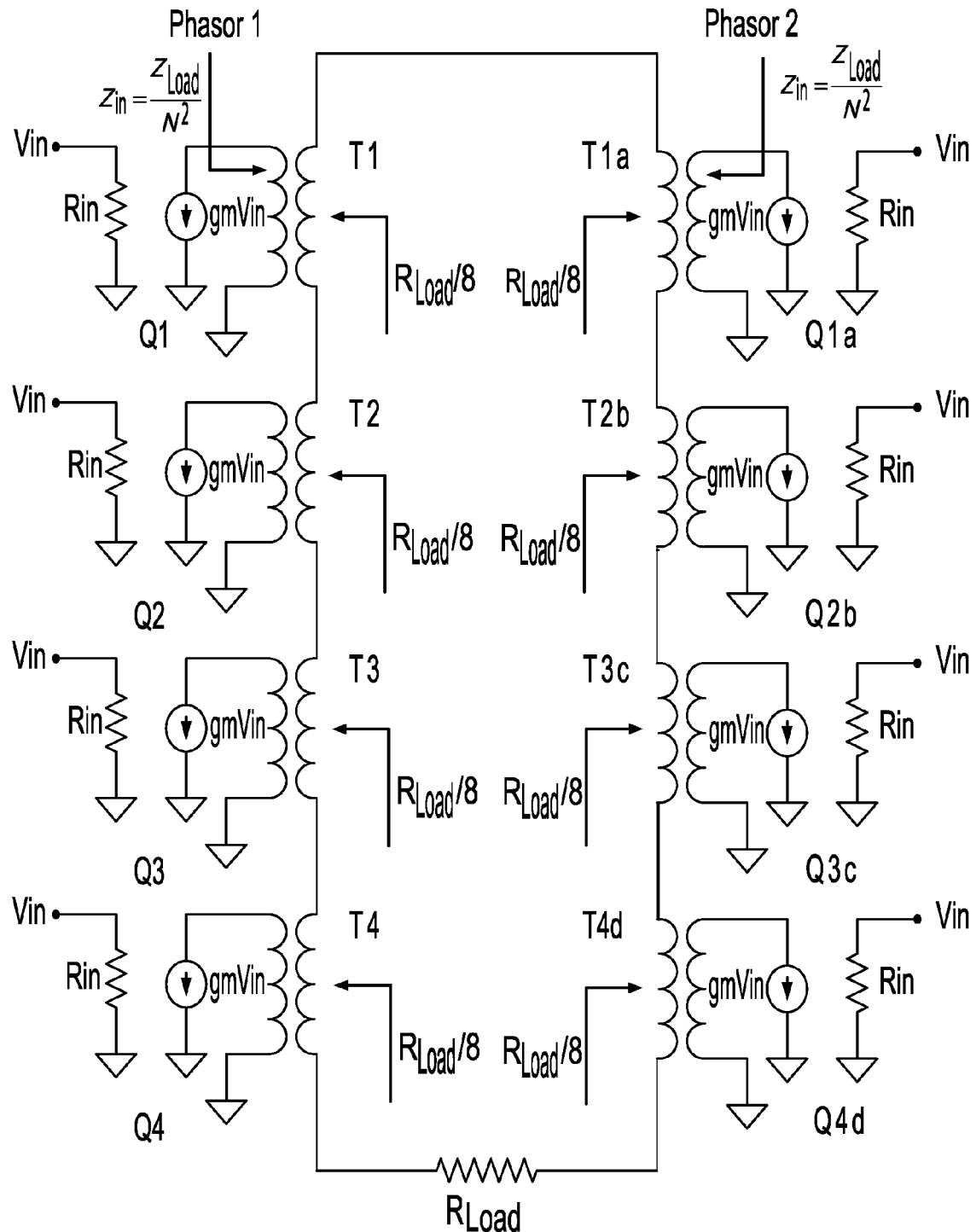
FIG. 5 is a circuit diagram of an exemplary power amplifier used in achieving QAM modulation with constant envelope phasors.

In the example of FIG. 5, an exemplary number of current source output stages Q1 to Q4, with an output current of a transconductance $g_m$ multiplied by the voltage input Vin, are connected to a stacked transformer marked as T1 to T4 for one phasor (e.g., Phasor 1, which is coupled to at least the primary of an output stage (Q1)). Similarly, output stages Q1a, Q2b, Q3c, and Q4d are connected to a stacked transformer marked as T1a to T4d for the other phasor (e.g., Phasor 2, which is coupled to at least the primary of an output stage (Q1a)). In this configuration, each stage has an output transformer with reduced turns ratio and, therefore, with a wider bandwidth. The transforming ratio of the impedance is given by the following relationship:

$$Z_{in} = \frac{Z_{Load}}{N^2} \qquad (32)$$

where N represents turns ratio.

In an aspect where there an odd mode configuration of the power amplifier, $Z_{Load} = R_{Load}/2$ as illustrated previously in FIG. 4. Since the transformers T1-T4 are in a stacked configuration, the current is constant and the overall output voltage delivered to the load is the sum of series voltages across the secondary coils of T1 to T4. As a result, the overall power delivered to the load is given by:

$$P_{out} = I_{out} \cdot (4 \cdot V_{out}) \qquad (33)$$

where $V_{out}$ is the voltage generated at the secondary of the transformer. The same result occurs on the Phasor 2 side as well. Accordingly, it will be evident to those skilled in the art that each secondary load is $\frac{1}{8}R_{Load}$ due to the odd mode operation and due to the stacking.

As a consequence of the configuration in FIG. 5, the overall voltage on the load is the superposition or summed combination of the two phasors, which then resembles a symbol of a QAM constellation. It is noted that although the example of FIG. 5 illustrates four stages for each phasor, one skilled in the art will appreciate that the power amplifier can be realized by more or less stages for each side as well. It is noted, however, that the design of FIG. 5 and variants thereof involve a compromise between transformer loss (i.e., the power combined loss), bandwidth and the transformation ratio (i.e., the turns ratio that affects transformer bandwidth and loss).

It may be appreciated that the system of FIG. 5 affords each power amplifier to be driven by a lower power. Additionally, the low transformation ratio makes it feasible on a chip or integrated circuit or similar device. In addition, the output load is isolated or, in other words, is "floating" from the power amplifier output. Furthermore, since the load-feed is differential in some aspects, harmonics are also cancelled. It is clear that the load value on the secondary of the matching transformer is reduced compared to the original single ended load due to the odd mode (differential operation as well as the number of stacked units. Thus, in general the input impedance may be represented as:

$$Z_{in} = \frac{Z_{Load}}{kN^2} = \frac{R_{Load}}{2kN^2} \qquad (34)$$

where k is the number of stacked transformers at each branch and $Z_{Load} = R_{Load}/2$ due to the differential mode of operation and symmetry to a virtual ground. In a further aspect, the output stages creating the current source may be biased to class B or C operation and, thus, the power amplifier is capable of more efficient operation owing to the nature of the input signal being a constant envelope signal.

Figure 6:
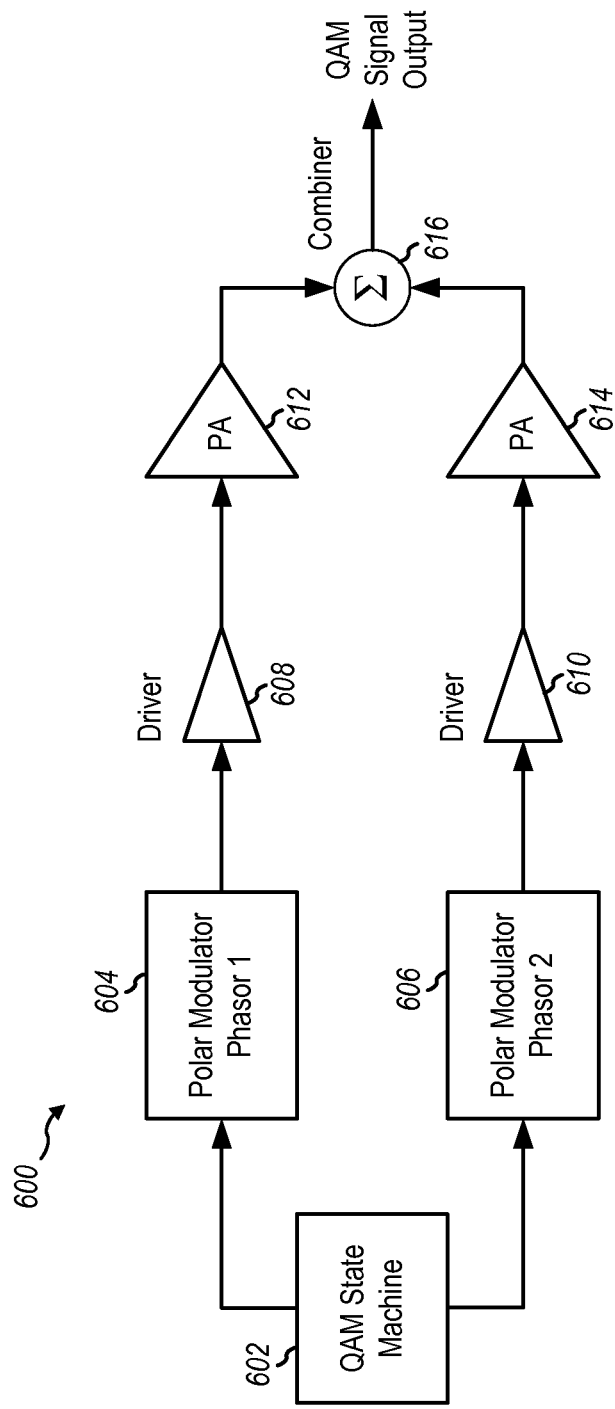
FIG. 6 is a block diagram of an exemplary apparatus for QAM modulation.

FIG. 6 illustrates a generalized apparatus 600 for achieving QAM modulation using two constant envelope phasors. As illustrated, apparatus 600 includes a QAM state machine 602 for generating I and Q data according to a QAM modulation scheme, as well as translating the data into two constant envelope phasors and phase shifting one of the phasors according to the methodology discussed previously. The two phasors are respectively fed to polar modulators 604 and 606 for polar modulating the phasors. The apparatus 600 may include drivers 608 and 610 that respectively receive the phasors 1 and 2 and, in turn, produce a driving signal for power amplifiers 612 and 614. The power amplifiers 612, 614 amplify the signals (i.e., phasors) for transmission over either a wireless or a wired link. A summation combiner 616 superposes the two amplified phasors such that a QAM signal is output for transmission. As discussed before, the use of two constant envelope phasors allows any symbol in a QAM modulation scheme to be created when combined while allowing the power amplifier to amplify to a set envelope value. Thus, the amplifiers 612, 614 may be operated in a more efficient saturation mode, as linear amplification is not necessary.

It is noted that an issue in QAM modulation schemes, however, is the quadrature calibration. Additionally, that calibration must comply with the entire system's bandwidth of operation. Because residual amplitude modulation (AM) could result using the above described methods and apparatus, however, residual side band calibration may be not optimal. Accordingly, the apparatus of FIG. 6 may be modified to include a feedback system as illustrated in FIG. 7.

Figure 7:
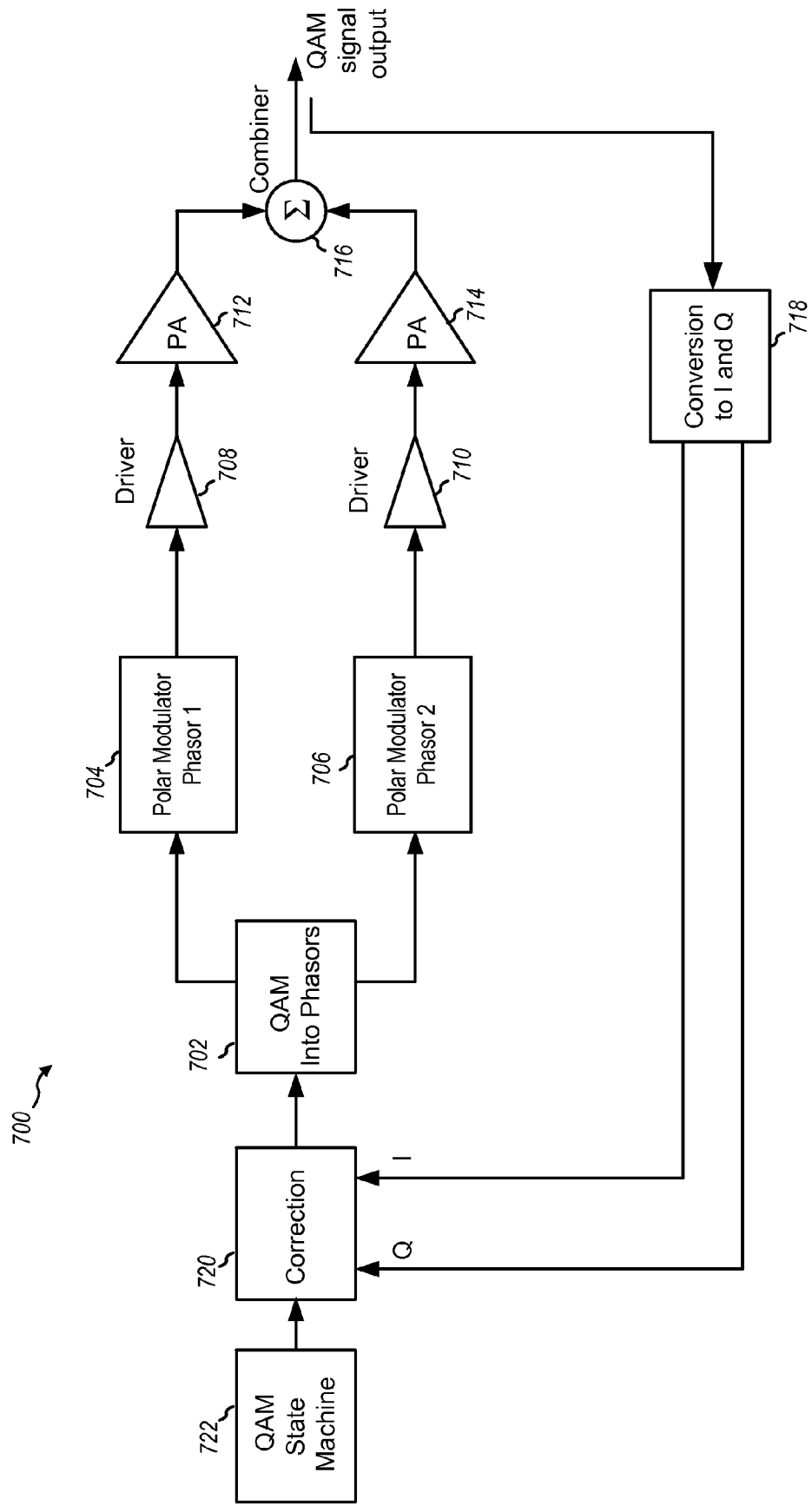
FIG. 7 is a block diagram of an exemplary apparatus for QAM modulation using feedback for calibration of the QAM modulation.

As illustrated, FIG. 7 shows an apparatus for QAM modulation that includes a block 702 for translating a QAM symbol into two constant envelope phasors and phase shifting one of the phasors, and polar modulators 704, 706 for respectively PM modulating the phasors (Phasors 1 and 2). Additionally, the apparatus 700 includes drivers 708 and 710 driving respective power amplifiers 712 and 714. A combiner 716 combines the phasors 1 and 2 to engender a QAM output signal.

In order to achieve better calibration, apparatus 700 also includes a feedback system that feeds the QAM output signal to a conversion block 718 that derives the I and Q values of the QAM output signal. Although not shown, the conversion block 718 may be implemented with a synthesizer and an I/Q mixer to derive the I and Q values. These values, in turn, are input to a correction block 720 operable to provide phase and amplitude corrections to the original QAM symbols generated by a QAM state machine 722 prior to translation by unit 702 into the constant envelope phasors. In this manner, the feedback system of apparatus 700 affords more accurate generation of the QAM constellation symbols during transmit (Tx) activity.

In another aspect, calibration could be performed within a receiver, such as in a mobile unit, rather than at the transmitter. In particular, a leakage path is created. The receiver is set to the transmitters' frequency and bit error ratio (BER) is evaluated for a calibration sequence. The power amplifier is then mapped for all power levels, and a correction table for phase and amplitude is generated. This data may then be used to compensate the phase and amplitude impairments when the mobile unit operates in a normal mode.

It is noted that the efficiency of power amplifiers discussed above is related to several parameters such as amplitude mismatch, phase error, and bias considerations. Phase error affects the differential alignment of the two phasors for achieving the QAM signal, as can be deduced from equations (24) through (27) above. Such misalignment may add extra dissipation on the load. This may also apply to amplitude errors generated by the I/Q translator (e.g., 406 or 602). Such errors can be minimized, however, by the calibration feedback as discussed in the example of FIG. 7.

Figure 8:
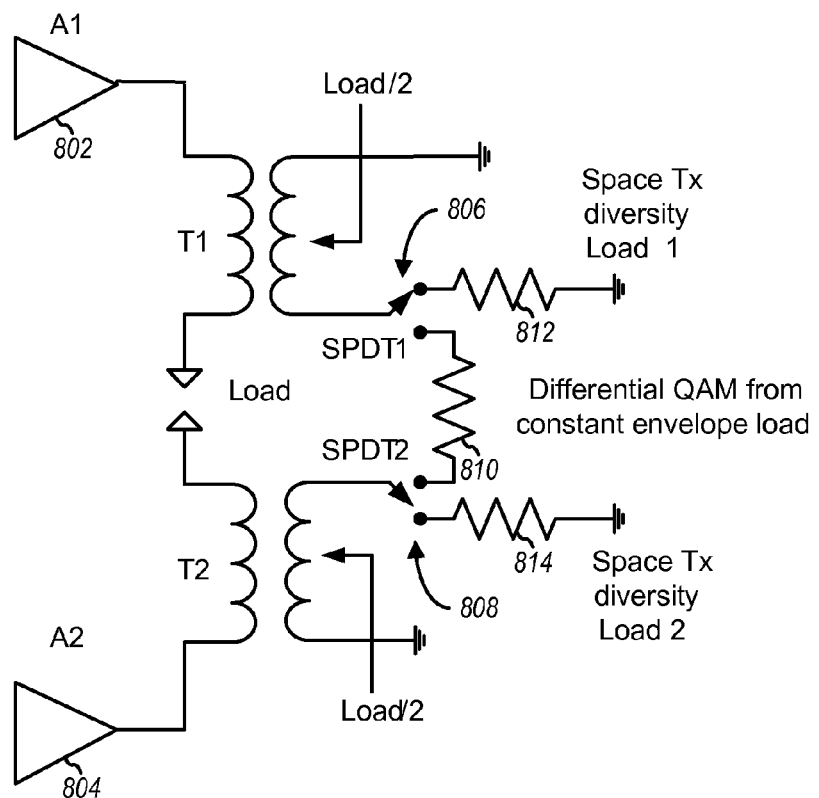
FIG. 8 is a circuit diagram of an alternative apparatus for selectively achieving QAM modulation with two constant envelope phasors or spatially diverse transmission of the two phasors.

It is noted that the methods and apparatus discussed above may be applied to various transmitters, wireless or wired, as well as different transmission schemes such as wireless transmit diversity scheme (e.g., multiple-input and multiple-output (MIMO) antenna schemes). As an example, FIG. 8 illustrates an alternative with a modified QAM modulation transmit circuit, such as a modification of those shown previously in FIG. 4 or FIG. 6. The QAM synthesis using two constant envelope lower power amplifiers denoted as A1 (802) and A2 (804) in FIG. 8 can be leveraged to generate space diversity for a MIMO system as one example. During a QAM mode a selective switching means comprised of two single pole, double throw (SPDT) switches 806 and 808, in one example, may either route the outputs of amplifiers 802 and 804 to a differential load 810 or to two loads 812, 814 used in a space diversity transmit (Tx) mode. Since the illustrated example is an odd mode of operation, a virtual ground (GND) can be connected to GND. This connection enables the option of two transmissions for two loads 812, 814 in space diversity Tx mode that can be used for MIMO. It will be appreciated by those skilled in the art that an extra matching network (not shown) can be added for both amplifiers 802, 804, which can be optimized per mode of operation with a control scheme (not shown) or other means.

Figure 9:
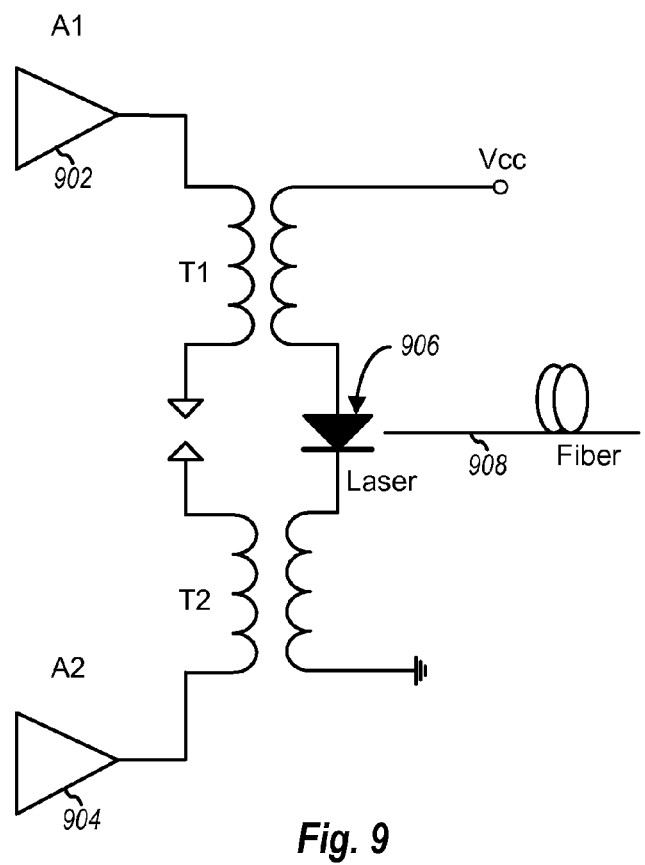
FIG. 9 is a circuit diagram of an alternative apparatus for achieving QAM modulation for transmission on a fiber network by differential excitation of laser using two constant envelope phasors.

FIG. 9 illustrates another alternative use for the presently disclosed QAM modulation transmit circuit in a wired or optical network. In particular, the concept of two constant envelopes transmissions used to create a QAM is not limited to wireless applications, but may also be used for cable TV on fiber optics or cellular transfer of RF over Fiber as well. In the example of FIG. 9, amplifiers 902, 904 provide the phasors to respective coils T1 and T2. Coil excitation then effects differential modulation of a laser diode 906 (or similar device capable of generating coherent modulated light) having a power source $V_{cc}$. In the circuit of FIG. 9, the laser 906 is modulated differentially and the output onto a fiber 908 is a QAM modulated light. It is noted that this scheme is applicable to external modulations of lasers such as Mach Zehnder or other types.

Figure 10:
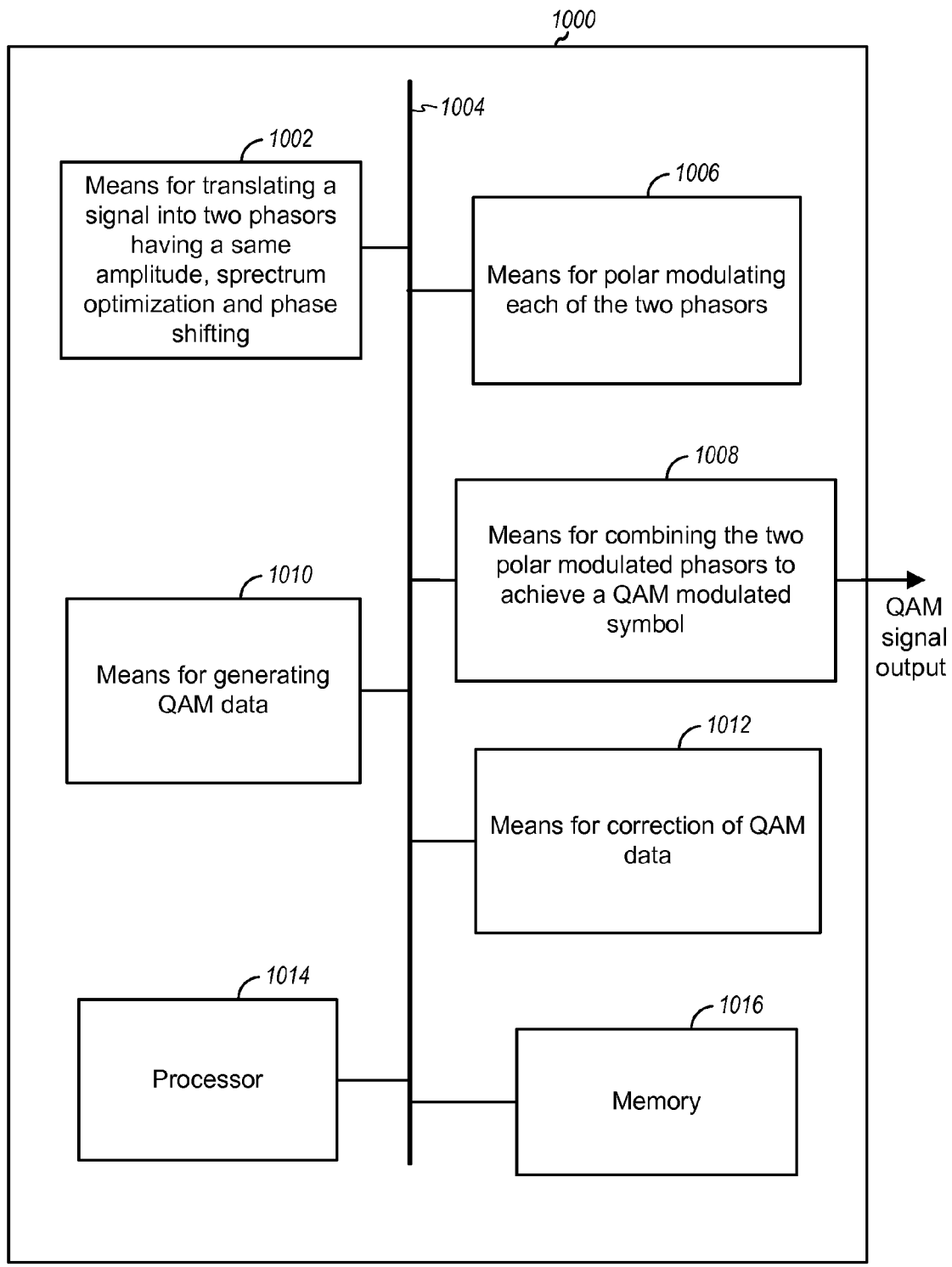
FIG. 10 illustrates another apparatus for achieving QAM modulation with constant envelope phasors.

FIG. 10 illustrates another apparatus for QAM modulation according to the present disclosure. The apparatus 1000 may be a transmitter or a portion of a transmitter. Apparatus 1000 includes means 1002 for translating a signal into two phasors having a same amplitude and then phase shifting one of the phasors by 180 degrees. Means 1002 also includes spectrum optimization including one or more of minimizing spectral broadening, excessive energy and zero crossings. In an aspect, means 1002 may be implemented with translator 406 and phase shift unit 408 in FIG. 4 or QAM state machine 602 in FIG. 6, as merely two examples. The phasors generated by means 1002 having a same amplitude may constitute constant envelope phasors. As merely an exemplary indication of communicative coupling of the various modules and means in apparatus 1000, a bus 1004 is illustrated to illustrate that signals or information may be exchanged in apparatus 1000.

Means 1006 for polar modulating each of the two phasors is included to modulate the phasors generated by means 1002. This means, according to an aspect, may be implemented as I/Q modulators 410, 412 in FIG. 4 or Polar modulators 604, 606 in FIG. 6 as merely two examples. According to a further aspect, means 1006 may also include implementation with a local oscillator, such as LO 414 in FIG. 4, or similarly functioning device.

The polar modulated phasors generated by means 1006 are then combined by means 1008 for differentially combining the two polar modulated phasors. The means to combine 1008 yields a QAM modulated symbol. Means 1008 may be implemented by one or more of a combiner such as combiner 616 in FIG. 6 or a transformer such as 420 in FIG. 4. According to further aspects, means 1008 may also include devices such as a power amplifier, driver, or a transformer having series and/or parallel connected current sources such as illustrated in the amplifier of FIG. 5. It is still further noted that means 1008 may also serve the function of transmitting the QAM signals output resultant from the phasor superposition in means 1008 or causing another means (not shown) to carry out transmission, whether wireless or landline based.

In an alternative, apparatus 1000 may also include means 1010 for generating initial QAM symbols to be transmitted. In an example, means 1000 could be implemented by QAM state machines 602 or 722 in FIGS. 6-7 or modem 402 in FIG. 4. Furthermore, apparatus 1000 may further include a means 1012 for correction of the QAM data. For example, means 1012 may be implemented by a feedback circuit as illustrated by FIG. 7, and in particular units 718 and 720.

Apparatus 1000 also may include a processor 1014 and associated memory 1016 for storing computer-readable instructions and data thereon. Processor 1014 may be configured to perform or assist with some or all of the functions of means 1002 and 1006-1012.

Figure 11:
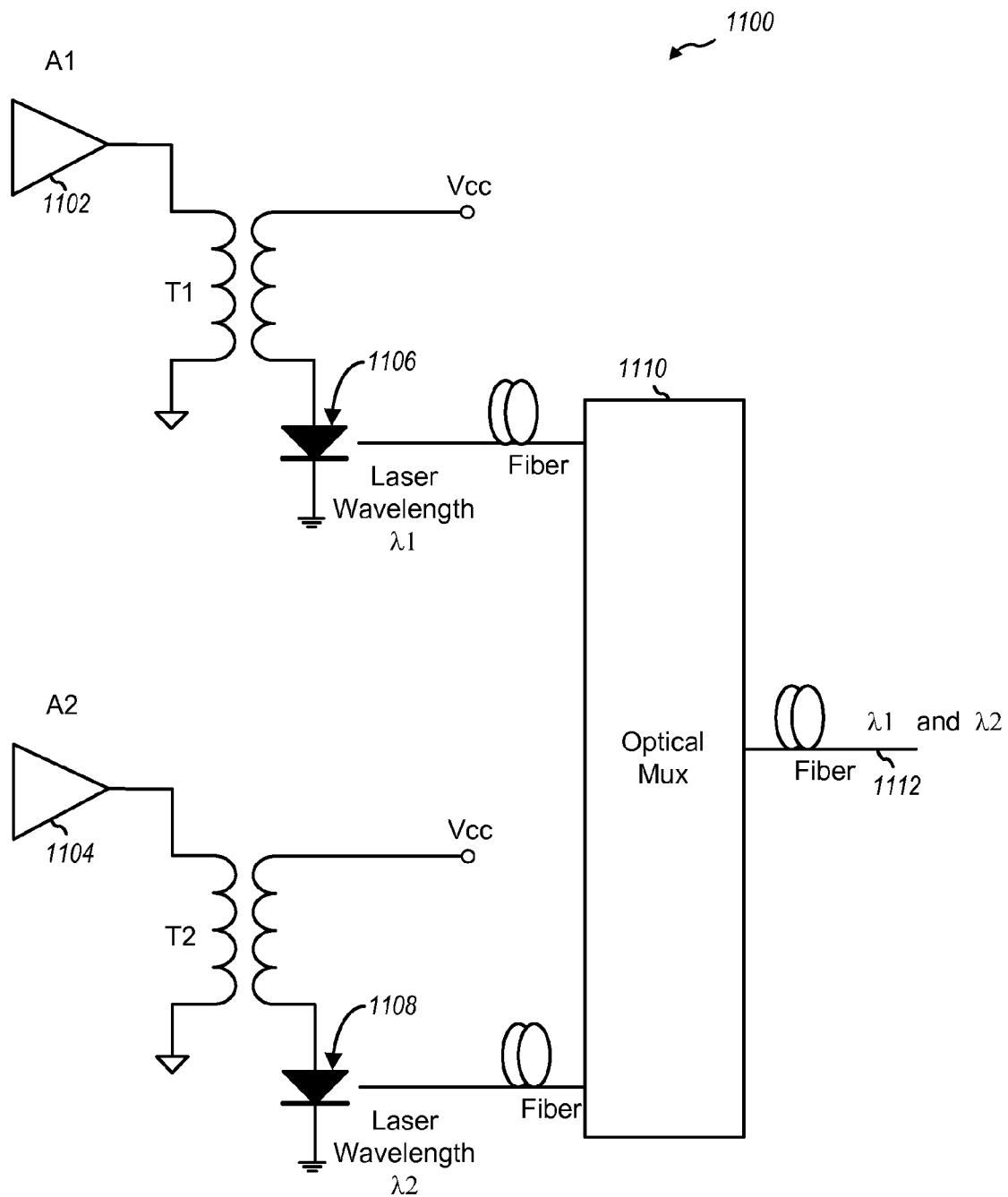
FIG. 11 illustrates a circuit diagram of another transmitter for achieving QAM modulation for wave division multiplexed (WDM) transmission on a fiber network by differential excitation of laser using two constant envelope phasors.

FIG. 11 illustrates yet another apparatus 1100 employing the present QAM modulation for optical transmission using WDM on a fiber. As illustrated, apparatus 1100 includes first and second power amplifiers 1102, 1104, which respectively receive a constant envelope phasor translated from an input signal as discussed previously. Each amplifier drives a respective transformer T1, T2 in order to respectively modulate two lasers 1106 and 1108 having respective wavelengths $\lambda 1$ and $\lambda 2$. The two wavelength signals are transmitted using an optical multiplexer 1110 that effects WDM (wave division multiplexing) on a fiber 1112.

Figure 12:
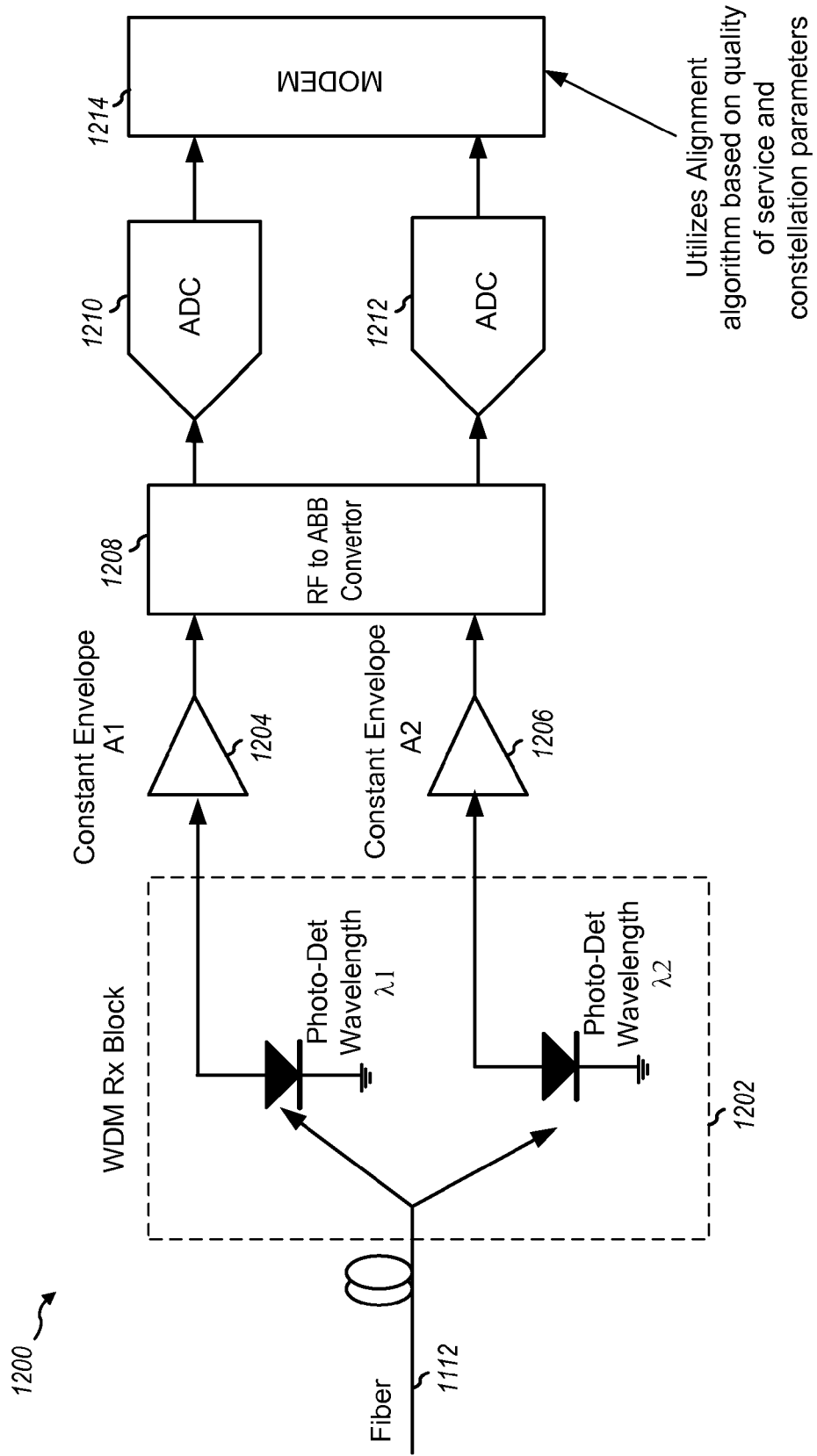
FIG. 12 illustrates a circuit diagram of a receiver for receiving and demodulating the signals sent by the transmitter of FIG. 11.

FIG. 12 illustrates a complementary receiver apparatus 1200 that receives and demodulates the signals transmitted over fiber 1112 shown in FIG. 11. As illustrated, the receiver 1200 has a WDM receive block 1202 configured to demultiplex the two signals of different wavelengths $\lambda 1$ and $\lambda 2$. Each of the signals is routed to a respective optical receivers with dedicated photo-detectors configured for the particular wavelength. The optical signals, which are a constant envelope signal due to the modulation of transmitter 1100, are converted into electrical signals by the photo-detectors and then amplified by respective amplifiers 1204, 1206. The signals, which are RF signals, are next down converted into baseband signals by downconverter 1208 and then sampled by an A/D converter 1210, 1212. The digital signals are then input to a modem 1214 for further digital signal processing (DSP) to demodulate the signals and combining to derive the original signal. The DSP processing may be configured to perform alignment based on BER criterion. A training sequence may be used for this alignment. It is noted that the concepts of FIGS. 11 and 12 are applicable to closed area television (CATV) systems or optical hoping for a base transceiver station (BTS). The alignment algorithm used in the DSP may be based on quality of service and constellation parameters According to yet another aspect, it is noted that rather than combining or summing the two constant envelope phasors at a transmitter prior to transmission as disclosed above, the two constant envelope phasors could instead be transmitted and subsequently combined at the receiver side (not shown). Thus, the need for the output combination of the power amplifier circuit as disclosed above could be eliminated. Examples of where this could be applicable are WiFi applications and cellular applications. In this alternative, one skilled in the art would appreciate that a receiver receiving such signals would include equalization circuits to match phase and amplitude and to correct all other link impairments.

The word "exemplary" is used herein to mean "serving as an example, instance, or illustration." Any example described herein as "exemplary" is not necessarily to be construed as preferred or advantageous over other examples.

It is understood that the specific order or hierarchy of steps in the processes disclosed is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present disclosure.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Additionally, the storage medium may be considered a computer program product that includes computer-readable media containing instructions or code that, when read by a processor, causes the processor to implement various steps or functions of the disclosed methods or algorithms. The processor and the storage medium may reside in an ASIC. The ASIC may reside in a user terminal. In the alternative, the processor and the storage medium may reside as discrete components in a user terminal.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the present disclosure. Thus, the present disclosure is not intended to be limited to the examples shown herein but is to be accorded the widest scope consistent with the principles and novel features disclosed herein.

What is claimed is:

1. A method of quadrature amplitude modulation (QAM) of data in a communication system, the method comprising: translating an input signal into two phasors having a same amplitude, including spectrum optimization and phase shifting one of the two phasors by 180 degrees; polar modulating each of the two phasors; differentially combining the two polar modulated phasors in a load to achieve a QAM modulated symbol; and transmitting the QAM modulated symbol over one of a wireless network, a wired network, or a fiber network.

2. The method of claim 1, wherein combining the two polar modulated phasors includes:
amplifying each of the polar modulated phasors using respective amplifiers operable in a non-linear mode.

3. The method of claim 2, further comprising:
adjusting a bias voltage for at least one of the amplifiers based on information derived during translation of the input signal.

4. The method of claim 3, wherein the information includes at least one of peak-to-average ratio (PAR) and signal-to-average ratio (SAR) information derived during translation of the input signal.

5. The method of claim 1, wherein combining further comprises:
amplifying each of the two polar modulated phasors in a stacked transformer configuration comprising two or more transformers.

6. The method of claim 5, wherein each primary coil of each stacked transformer in the stacked transformer is driven with a constant current, and at least one primary coil of one of the stacked transformers is excited by one of the two phasors.

7. The method of claim 1, wherein transmitting the QAM modulated symbol over a fiber network further includes:
converting each of the two phasors to a respective optical signal having a respective wavelength; and
wave division multiplexing the optical signals on a fiber for transmission over the fiber.

8. The method of claim 1, further comprising:
calibrating the translation of the signal into two phasors including:
converting the QAM modulated symbol into respective in-phase (I) and quadrature (Q) components;
correcting I and Q values of the input signal based on the respective I and Q components from the converted QAM modulated symbol prior to translation of input signal into the two phasors.

9. The method of claim 1, further comprising:
in lieu of differentially combining the two polar modulated phasors, delivering the two polar modulated phasors in respective spatially diverse loads.

10. The method of claim 1, wherein spectrum optimization comprises minimizing one or more of spectral broadening, excessive energy, and zero crossings.

11. An apparatus for QAM modulation of data in a communication system comprising: means for translating an input signal into two phasors having a same amplitude, including spectrum optimization and phase shifting one of the two phasors by 180 degrees; means for polar modulating each of the two phasors; means for differentially combining the two polar modulated phasors to achieve a QAM modulated symbol; and means for transmitting the QAM modulated symbol over one of a wireless network, a wired network, or a fiber network.

12. The apparatus of claim 11, wherein the means for combining the two polar modulated phasors includes:
means for amplifying each of the polar modulated phasors in an amplifier saturation mode.

13. The apparatus of claim 12, further comprising:
means for adjusting a bias voltage for at least one of the amplifiers based on information derived during translation of the input signal.

14. The apparatus of claim 13, wherein the information includes at least one of peak-to-average ratio (PAR) and signal-to-average ratio (SAR) information derived during translation of the input signal.

15. The apparatus of claim 11, the means for combining further comprising:
means for amplifying each of the two polar modulated phasors in a stacked transformer configuration comprising two or more transformers.

16. The apparatus of claim 11, further comprising:
means for driving each primary coil of each stacked transformer in the stacked transformer with a constant current, and means for exciting at least one primary coil of one of the stacked transformers with one of the two phasors.

17. The apparatus of claim 11, wherein the means for transmitting the QAM modulated symbol over a fiber network further includes:
means for converting each of the two phasors to a respective optical signal having a respective wavelength; and
means for wave division multiplexing the optical signals on a fiber for transmission over the fiber.

18. The apparatus of claim 11, further comprising:
means for calibrating the translation of the signal into two phasors including:
means for converting the QAM modulated symbol into respective in-phase (I) and quadrature (Q) components; and
means for correcting I and Q values of the input signal based on the respective I and Q components from the converted QAM modulated symbol prior to translation of input signal into the two phasors.

19. The apparatus of claim 11, further comprising:
means for delivering the two polar modulated phasors to respective spatially diverse loads in lieu of the means for differentially combining the two polar modulated phasors.

20. The apparatus of claim 11, wherein spectrum optimization performed by the means for translation comprises minimizing one or more of spectral broadening, excessive energy, and zero crossings.

21. An apparatus for QAM modulation of data in a communication system comprising: a translator configured to translate an input signal into two phasors having a same amplitude and optimize the spectrum of the translated input signal; a phase shifter configured to phase shift one of the two phasors by 180 degrees; first and second polar modulators configured to respectively receive and polar modulate a respective phasor of the two phasors; a combiner configured to differentially combine the two polar modulated phasors in a load to achieve a QAM modulated symbol; and a transmitter configured to transmit the QAM modulated symbol over one of a wireless network, a wired network, or a fiber network.

22. The apparatus of claim 21, further comprising:
first and second amplifiers configured to respectively receive a polar modulated phasor from the first and second polar modulators and to amplify the polar modulated phasors, the first and second amplifiers configured to operate in a saturation mode.

23. The apparatus of claim 22, further comprising:
at least one bias voltage adjusting unit configured to adjust a bias voltage of at least one of the first and second amplifiers based on information derived in the translator during translation of the input signal.

24. The apparatus of claim 23, wherein the information includes at least one of peak-to-average ratio (PAR) and signal-to-average ratio (SAR) information derived during translation of the input signal.

25. The apparatus of claim 21, further comprising:
a first stacked transformer comprising a plurality of transformers and configured to amplify a first phasor of the two polar modulated phasors; and
a second stacked transformer comprising another plurality of transformers and configured to amplify a second phasor of the two polar modulated phasors.

26. The apparatus of claim 21, further comprising:
a first plurality of constant current sources configured to respectively drive each primary coil of the plurality of transformers in the first stacked transformer with a constant current;
a second plurality of constant current sources configured to respectively drive each primary coil of the another plurality of transformers in the second stacked transformer with a constant current;
a first coupling configured to couple at least one primary coil of one of the plurality of first stacked transformers with the first phasor; and
a second coupling configured to couple at least one primary coil of one of the plurality of second stacked transformers with the first phasor.

27. The apparatus of claim 26, wherein the secondary coils of the first stacked transformer and the second stacked transformers are connected to a load in a differential manner.

28. The apparatus of claim 21, wherein the transmitter configured to transmit the QAM modulated symbol over a fiber network further includes:
a plurality of optical converters configured to respectively covert each of the two phasors to a respective optical signal having a respective wavelength; and
a wave division multiplexer configured to multiplex the optical signals on a fiber for transmission over the fiber.

29. The apparatus of claim 21, further comprising:
a converter configured to receive via a feedback coupling the QAM modulated symbol and convert the symbol into respective in-phase (I) and quadrature (Q) components; and
a correction unit configured to correct I and Q values of the input signal based on the respective I and Q components from converter prior to translation of input signal into the two phasors by the translator.

30. The apparatus of claim 21, further comprising:
a selective switching device configured to couple the two polar modulated phasors to one of the combiner and an associated differential load or to two loads used in a space diversity transmit (Tx) mode in lieu of delivery to the combiner.

31. The apparatus of claim 21, wherein the apparatus further comprises:

a transmitter configured to transmit the two polar modulated phasors without use of the combiner prior to transmission; and
a receiver configured to receive the two polar modulated phasors, wherein the receiver includes the combiner configured to combine the two polar modulated phasors to achieve a QAM modulated symbol.

32. The apparatus of claim 21, wherein the translator is configured to perform spectrum optimization by including minimizing one or more of spectral broadening, excessive energy, and zero crossings.

33. A computer program product, comprising: non-transitory computer-readable medium comprising: code for causing a computer to translate an input signal into two phasors having a same amplitude for QAM modulation of data in a communication system including spectrum optimization of the translated input signal and phase shifting one of the two phasors by 180 degrees; code for causing a computer to polar modulate each of the two phasors; code for causing a computer to control differential combining of the two polar modulated phasors in a load to achieve a QAM modulated symbol; and code for causing a computer to transmit the QAM modulated symbol over one of a wireless network, a wired network, or a fiber network.

34. The computer program product of claim 33, wherein code for causing a computer to control combining of the two polar modulated phasors includes:
code for causing a computer to control amplification of each of the polar modulated phasors including operating an amplifier in saturation mode.

35. The computer program product of claim 33, wherein code for causing a computer to translate an input signal further includes:
code for causing a computer to adjust a bias voltage for the amplifier based on information derived during translation of the input signal.

36. The computer program product of claim 35, wherein the information includes at least one of peak-to-average ratio (PAR) and signal-to-average ratio (SAR) information derived during translation of the input signal.

37. The computer program product of claim 33, wherein the code for causing a computer to control combining of the two polar modulated phasors includes:
code for causing a computer to control amplification of each of the two polar modulated phasors in a stacked transformer configuration comprising two or more transformers.

38. The computer program product of claim 37, further comprising:
code for causing a computer to drive each primary coil of each stacked transformer in the stacked transformer with a constant current; and
code for causing a computer to control excitation of at least one primary coil of one of the stacked transformers with one of the two phasors.

39. The computer program product of claim 33, wherein code for causing a computer to transmit the QAM modulated symbol over a fiber network further includes:
code for causing a computer to control conversion of each of the two phasors to a respective optical signal having a respective wavelength; and
code for causing a computer to control wave division multiplexing of the optical signals on a fiber for transmission over the fiber.

40. The computer program product of claim 33, further comprising:

code for causing a computer to control calibrating the translation of the signal into two phasors including:
  code for causing a computer to convert the QAM modulated symbol into respective in-phase (I) and quadrature (Q) components; and
  code for causing a computer to correct I and Q values of the input signal based on the respective I and Q components from the converted QAM modulated symbol prior to translation of input signal into the two phasors.

41. The computer program product of claim 33, further comprising:
  code for causing a computer to control delivery of the two polar modulated phasors to respective spatially diverse loads in lieu of the means for combining the two polar modulated phasors.

42. The computer program product of claim 33, wherein spectrum optimization comprises minimizing one or more of spectral broadening, excessive energy, and zero crossings.

\* \* \* \* \*